2,995,610
ISOBUTYLBENZENE PREPARATION
Luke A. Schaap, South Holland, Ill., assignor to Standard Oil Company, Chicago, Ill., a corporation of Indiana
No Drawing. Filed Mar. 24, 1959, Ser. No. 801,458
7 Claims. (Cl. 260—668)

This invention relates to the preparation of butylbenzene and particularly to isobutylbenzene by the alkylation of toluene with propylene.

It is known that toluene and olefins can be alkylated to form a longer side-chain benzene. This process is particularly exemplified in U.S. 2,488,641 which utilizes alkali metals per se as the catalyst. This process is ineffective in terms of yield of product based on olefin charge. It is an object of the invention to prepare butylbenzenes by the alkylation of toluene with propylene using a sodium or potassium type catalyst. A particular object is a process for the preparation of butylbenzenes containing substantially only isobutylbenzene by the alkylation of toluene with propylene. A further object is a process for preparing butylbenzenes by the alkylation of toluene with propylene distinguished by good yields of butylbenzenes. Other objects will become apparent in the course of the detailed description of the invention.

Briefly, the process of the invention comprises contacting liquid toluene and propylene in the presence of a solid particulate catalyst consisting of sodium and/or potassium supported on active carbon. The process is carried out at a temperature between about 140° C. and 300° C. The hydrocarbon reaction product mixture contains butylbenzene which is readily separable from said mixture.

The catalyst used in the process of the invention consists of sodium and/or potassium on an active carbon support. Sodium is a preferred metal. In general, the catalyst consists of between about 10% and 35% by weight of metal and the remainder active carbon. Activated charcoal from vegetable sources such as coconut charcoal is a preferred support.

The catalyst may be prepared by any of the usual techniques for placing an alkali metal on a solid support; for example, activated charcoal particles and the defined metal are agitated at a temperature in excess of the melting point of the metal until the metal has been fairly uniformly distributed over the activated charcoal. A catalyst preparation temperature of about 300° C., in an inert atmosphere, is particularly suitable.

While the broad catalyst composition contains between about 10% and 35% by weight of sodium and/or potassium, a preferred metal content of the catalyst is between about 15% and 25%.

The contacting of toluene and propylene is carried out under conditions of pressure such that the toluene is liquid at the temperature of contacting; this temperature is between about 140° C. and 300° C. A preferred range of temperature of contacting is from 150° C. to 190° C.

The contacting of toluene and propylene is continued for a time sufficient to produce an appreciable yield of butylbenzene. In general, a small amount of propylene polymer will be produced; however, substantially all of the propylene reacts to form butylbenzene if a long enough period of contacting is given. At shorter periods of contacting, the unreacted propylene is recovered as such and may be recycled to the reaction zone.

Tests

The illustrative operations utilized catalysts of the process of the invention and also catalysts of the prior art and lithium; lithium is ineffective for the process of this invention. The tests were carried out by agitating the carbon support and alkali metal in a reaction vessel provided with a stirrer. In all cases the catalyst was prepared by agitation at about 300° C. under a nitrogen atmosphere. After the alkali metal and carbon were thoroughly intermingled the vessel was cooled and 100 ml. of toluene added. About 20 grams of propylene were then charged to the reaction vessel and the contents of the vessel were stirred for the desired time at the desired temperature. The gaseous material was removed from the vessel. The liquid portion of the hydrocarbon reaction product mixture was filtered to remove catalyst and then distilled to separate the butylbenzene fraction. Analysis of the hydrocarbon reaction product mixture in each instance consisted of unreacted propylene, butylbenzenes, and propylene dimer. The butylbenzene product fraction was analyzed for isomer content and found to consist only of isobutylbenzene and n-butylbenzene.

Tests 1–3

Tests 1, 2, and 3 were carried out using a commercial activated charcoal of vegetable origin as the particulate support. A different amount of sodium was placed on the charcoal in each run. In each test the contents of the vessel were stirred at 150–160° C. for 4 hours. Twenty grams of propylene were charged in each test with about one gram of propylene dimer formed. The butylbenzene yield was determined as mol percent based on propylene charged. Since the toluene was present in about 100% excess, i.e., the propylene to toluene molar ratio was 0.5, which is the middle of the preferred propylene to toluene mol ratio of 0.1 to 1. The mol ratio may be higher than this but there is a tendency to form more polymer as the propylene becomes in excess.

The results obtained in the tests 1–3 are set out below wherein the sodium content of the charcoal sodium-catalyst, the mol percent butylbenzene yield based on propylene charged, the isobutylbenzene and n-butylbenzene contents of butylbenzene product fraction are tabulated.

| Test | Sodium, weight percent | Mol percent butylbenzene | Butylbenzene distribution | |
|---|---|---|---|---|
| | | | Isobutyl | n-Butyl |
| 1 | 16.7 | 27 | 97 | 3 |
| 2 | 23.1 | 41 | 97 | 3 |
| 3 | 28.7 | 31 | 96 | 4 |

Tests 4–6

In these tests the effectiveness of a catalyst consisting of activated vegetable charcoal and potassium metal was studied. Under the conditions described for tests 1–3, the potassium content, yield of butylbenzene and butylbenzene isomer distribution for tests 4–6 are tabulated below. The comparison of tests 1–3 and tests 4–6 shows that approximately the same yield of product is obtained for both sodium and potassium but that a much better isobutylbenzene product distribution is obtained with the sodium containing catalyst.

| Test | Potassium, weight percent | Mol percent butylbenzene | Butylbenzene distribution | |
|---|---|---|---|---|
| | | | Isobutyl | n-Butyl |
| 4 | 16.7 | 31 | 90 | 10 |
| 5 | 23.1 | 42 | 90 | 10 |
| 6 | 28.7 | 36 | 88 | 12 |

Tests 7–8

In these tests activated alumina was used as the support to obtain a comparison of alumina and activated carbon.

The tests were carried out under the conditions and amounts shown in tests 1-3. The results of these tests using sodium supported by alumina are tabulated below.

| Test | Sodium, weight percent | Mol percent butylbenzene | Butylbenzene distribution | |
|---|---|---|---|---|
| | | | Isobutyl | n-Butyl |
| 7 | 9.1 | 7 | 95 | 5 |
| 8 | 23.1 | 4 | 95 | 5 |

Test 9

In this test the effectiveness of potassium supported by alumina was determined under the conditions of tests 1–3. In this test the catalyst consisted of 9.1 weight percent potassium and the remainder alumina. The yield of butylbenzene was 14 mol percent based on propylene charged. The isobutylbenzene content was 94% and the remainder butylbenzene.

Tests 7–9 show that alumina is extremely ineffective as a catalyst support and indeed in the sodium case seems to act as a poison.

Test 10

In this test which was carried out under the conditions of tests 1–3, 9 weight percent lithium on an activated vegetable charcoal support was used. Only a trace of butylbenzene product was obtained in this test.

Test 11

In order to have a comparison of alkali metal per se with the solid supported alkali metal catalysts of the process of the invention, tests were carried out in the reaction vessel described above using a mol ratio of 0.53, propylene to toluene, and two grams of potassium metal (no porous support was present). The reaction zone was stirred at 200–220° C. for 6 hours. The yield of butylbenzene based on propylene charge was 14 percent.

Test 12

In this test the mol ratio of propylene to toluene was 0.52. Also two grams of sodium and one gram of anthracene were charged to the vessel. The vessel was agitated for 7 hours at 260–265° C. The yield of butylbenzene in this tests was 15 percent based on propylene charged.

Inspection of the above data indicate that the use of alumina as a support with sodium metal very sharply decreases the yield of butylbenzene. Potassium supported by alumina apparently has about the same catalytic effectiveness as bulk potassium metal. Tests 11 and 12 are illustrative of the prior art processes. Tests 1–6 show that the active carbon supported sodium or potassium metals produce a yield of butylbenzene in a once-thru operation which is more than double than that obtainable by the prior art bulk alkali metal catalysts.

Thus having described the invention, what is claimed is:

1. A process for the alkylation of toluene in the side-chain which process comprises contacting liquid toluene and proylene, at a temperature between about 140° C. and 300° C., in the presence of a solid particulate catalyst, said catalyst consisting of (a) between about 10% and 35% by weight of a metal selected from the class consisting of sodium and potassium and (b) the remainder active carbon, for a time sufficient to obtain an appreciable yield of butylbenzene in the hydrocarbon reaction product mixture and separating butylbenzene product from said mixture.

2. The process of claim 1 wherein said carbon is activated charcoal.

3. The process of claim 1 wherein said metal is sodium.

4. The process of claim 1 wherein said metal is potassium.

5. The process of claim 1 wherein said temperature is between about 150° C. and 190° C.

6. The process of claim 1 wherein said metal content of said catalyst is between about 15% and 25%.

7. The process of claim 1 wherein said propylene and said toluene are charged in a molar ratio between about 0.1 and 1.

References Cited in the file of this patent

UNITED STATES PATENTS

| | | |
|---|---|---|
| 2,448,641 | Whitman | Sept. 7, 1948 |
| 2,748,178 | Pines et al. | May 29, 1956 |
| 2,849,508 | Pines | Aug. 26, 1958 |
| 2,867,673 | Chenicek et al. | Jan. 6, 1959 |